(12) United States Patent
Omicini (10) Patent No.: US 9,181,357 B2
(45) Date of Patent: Nov. 10, 2015

(54) SOLUTION PROCESS FOR THE PRODUCTION OF EP(D)M ELASTOMERS AND POLYMERISATION REACTOR FOR USE IN SAID PROCESS

(75) Inventor: Gabriele Omicini, Ferrara (IT)

(73) Assignee: FASTECH S.r.L., Seregno (IT)

( * ) Notice: Subject to any disclaimer, the term of this patent is extended or adjusted under 35 U.S.C. 154(b) by 76 days.

(21) Appl. No.: 14/117,441

(22) PCT Filed: May 15, 2012

(86) PCT No.: PCT/EP2012/058996
§ 371 (c)(1),
(2), (4) Date: Nov. 13, 2013

(87) PCT Pub. No.: WO2012/156393
PCT Pub. Date: Nov. 22, 2012

(65) Prior Publication Data
US 2015/0141591 A1    May 21, 2015

(30) Foreign Application Priority Data
May 16, 2011  (IT) ............... MI2011A0854

(51) Int. Cl.
*B01J 10/00* (2006.01)
*C08F 2/00* (2006.01)
*C08G 85/00* (2006.01)
(Continued)

(52) U.S. Cl.
CPC . *C08F 2/06* (2013.01); *B01J 8/222* (2013.01); *B01J 19/0006* (2013.01); *B01J 19/18* (2013.01); *C08F 2/01* (2013.01); *C08F 210/16* (2013.01); *C08F 210/18* (2013.01); *B01J 2208/00079* (2013.01); *B01J 2208/0084* (2013.01); *B01J 2208/00274* (2013.01); *B01J 2208/00911* (2013.01); *B01J 2219/00182* (2013.01);
(Continued)

(58) Field of Classification Search
CPC .... C08F 210/06; C08F 210/16; C08F 210/18; C08F 2/06; C08F 236/20; B01J 2208/00275
USPC ............. 526/348, 335, 68, 70; 422/129
See application file for complete search history.

(56) References Cited

U.S. PATENT DOCUMENTS 5,705,577 A * 1/1998 Rossi et al. ................ 526/68
2008/0207852 A1* 8/2008 Hama et al. ................ 526/65

FOREIGN PATENT DOCUMENTS

CA      1121875 A1   4/1982
EP      0236892 A2   9/1987
(Continued)

OTHER PUBLICATIONS

Transactions D Control—vol. 4—by Omega, p. 100, 2001.

*Primary Examiner* — William Cheung
(74) *Attorney, Agent, or Firm* — Novak Druce Connolly Bove + Quigg LLP (57) ABSTRACT

The invention describes a process for the production of EP(D)M in solution in a stirred reactor (CSTR) in which the reaction bath is kept in a boiling condition at a temperature of between 40 and 60° C. and at a pressure of between 0.6 and 1.3 MPa, and in which from 40% to 80% of the reaction heat is removed by boiling the reaction bath and the remaining reaction heat is removed by subcooling the fluids recycled to the reactor. The reactor is provided with a stirring system with three impellers, a device for distribution of the recycled fluids at the bottom of the reactor and a gamma ray level control device.

21 Claims, 4 Drawing Sheets

(51) Int. Cl.
*C08F 36/00* (2006.01)
*C08F 210/00* (2006.01)
*C08F 2/06* (2006.01)
*B01J 8/22* (2006.01)
*C08F 210/16* (2006.01)
*C08F 210/18* (2006.01)
*B01J 19/00* (2006.01)
*B01J 19/18* (2006.01)
*C08F 2/01* (2006.01)

(52) U.S. Cl.
CPC ... *B01J2219/00254* (2013.01); *B01J 2219/185* (2013.01); *B01J 2219/1943* (2013.01)

(56) References Cited

FOREIGN PATENT DOCUMENTS

| | | |
|---|---|---|
| WO | WO-94/13715 A1 | 6/1994 |
| WO | WO-96/33227 A1 | 10/1996 |
| WO | WO-2004/000900 A1 | 12/2003 |
| WO | WO-2006/044149 A1 | 4/2006 |
| WO | WO-2009/087731 A1 | 7/2009 |
| WO | WO-2011/008955 A1 | 1/2011 |
| WO | WO-2011/087731 A1 | 7/2011 |

* cited by examiner

SOLUTION PROCESS FOR THE PRODUCTION OF EP(D)M ELASTOMERS AND POLYMERISATION REACTOR FOR USE IN SAID PROCESS

CROSS REFERENCE TO RELATED APPLICATIONS

This application is a National Phase filing under 35 U.S.C. §371 of PCT/EP2012/058996 filed on May 14, 2013; and this application claims priority to Application No. MI2011A000854 filed in Italy on May 16, 2011, under 35 U.S.C. §119; the entire contents of all are hereby incorporated by reference.

The present invention concerns a solution process for the preparation of ethylene-propylene elastomeric copolymers (EPM) or ethylene-propylene-diene elastomeric terpolymers (EPDM), and to a polymerisation reactor for use in said process. Ethylene-propylene elastomeric copolymers and ethylene-propylene-diene elastomeric terpolymers are collectively designated as EP(D)M.

The polymerisation of ethylene, propylene with possibly a diene to produce EP(D)M elastomers is typically carried out in the presence of a Ziegler-Natta catalytic system, either of a conventional type or of the metallocene type. Conventional Ziegler/Natta catalyst systems comprising vanadium compounds, which are soluble in hydrocarbon solvents and therefore form an essentially homogeneous system, are widely used. Moreover the elastomeric polymers produced with these catalysts do not contain crystalline homopolymeric fractions or contain minimum quantities thereof. The vanadium compounds most commonly used commercially are vanadium oxytrichloride $VOCl_3$, vanadium tetrachloride $VCl_4$ and vanadium triacetylacetonate $V(acac)_3$.

The Z/N catalytic system also comprises the use of an alkyl aluminium as co-catalyst, for example diethyl aluminium chloride or ethyl aluminium sesquichloride, and possibly as a catalyst activator, as known in the field.

Control of the molecular weight of the copolymer EPM or terpolymer EPDM is obtained by the use of chain transfer agents, typically hydrogen or diethyl zinc.

In the solution processes, the monomers, the catalytic system and the molecular weight regulator, and any other components of the mixture or reaction bath, are fed to a polymerisation reactor. A solvent of the polymer formed, usually a saturated hydrocarbon such as hexane, is also fed to the polymerisation reactor. The polymerisation is performed in a temperature range of 10-60° C. and is exothermic, therefore the reaction heat must be removed. The reaction for the production of EP(D)M is one of the most complex currently known in the field of polymerisation processes. The production of EPDM involves three monomers with very different reactivity, a multi-component catalytic system in which the reaction ratios are essential for the quality of the product obtained, along with a molecular weight regulator, for example hydrogen, which is a very light gas and therefore very difficult to distribute uniformly in the reaction solution. Moreover the reaction solution is very viscous due to the dissolved polymer.

Furthermore a very wide range of EP(D)M types are produced for the various applications and comprise more than twenty different types, each of which must have very narrow specifications in terms of composition acceptability ranges, molecular weight and molecular weight distribution (MWD). Therefore the polymerisation reaction and control system must be such as to permit perfect reproducibility of the reaction conditions and their stability in the reaction time and space.

In the processes known so far, the polymerisation reaction is performed using equipment and procedures which make it difficult to control the reaction and ensure homogeneity of the reaction medium in time and space. For example, multiple reactors are widely used, connected in series or in parallel, with raw material and catalyst feed points from the top and/or from the bottom of the reactors with consequent difficulty in diffusion of the same within the polymeric solution. It is consequently difficult to obtain the same concentrations of the monomers, the molecular weight regulator and the components of the catalytic system in all points of the reactor.

Furthermore, the polymerisation heat is commonly disposed of via the refrigerated wall exchange, jacket and/or baffle, which creates a temperature gradient in the reaction bath between the centre of the reactor and refrigerated wall.

Lastly, due to fouling of the refrigerating wall by a fraction of the elastomer formed, the exchange coefficient progressively deteriorates, therefore reducing the capacity of the reactor and/or the control of the reaction temperature. In general, very slim reactors are used (ratio of height of cylindrical part/diameter >3), which in some cases operate completely full. One drawback of these reactors is that the solution overflows at the top, resulting in poor distribution of monomers and catalyst, and in differences of the temperature inside the reactor. These factors inevitably result in a product, which is non-uniform and variable over the time.

US 2008/0207852 A1 discloses a multi-stage solution process for producing ethylene-α-olefin copolymers carried out in two reactors in series. The heat generated by the polymerization reaction is removed with one of the following two methods: 1) a cooling jacket fitted to the reactor; or 2) a cooling method that uses the latent of evaporation (vaporization) of solvent and monomers (see paragraph [0035] of US 2008/0207852 A1). The examples do not provide any information about which cooling method is chosen or preferred. A process as the one described in US 2008/0207852 A1 suffers from several drawbacks.

First of all, as already mentioned above, use of multiple reactors connected in series makes it difficult to control the polymerization reaction and to ensure homogeneity of the reaction medium in time and space, so that it is also difficult to obtain the same concentrations of the monomers and components of the catalytic system in all points of the reactor.

With respect to the cooling method, as already mentioned above, use of a cooling wall or cooling jacket requires a high difference of temperature between the reaction bath and the cooling wall, namely a rather low temperature of the wall. Since the solubility of the EP(D)M produced decreases with the decrease of the temperature, this causes the formation of deposits of elastomer on the reactor wall. Fouling of the refrigerating wall by the elastomer formed thus occurs, and the heat exchange coefficient progressively deteriorates, thereby reducing the capacity of the reactor and/or the control of the reaction temperature.

On the other hand, use of the evaporation latent heat of solvent and monomer as the sole cooling method is also disadvantageous since it would require reactors with a very low ratio between the height of the liquid and the diameter of the reactor, namely reactors very large and of very limited height, which are not commercially viable.

EP 0 236 892 discloses a reactor for use in the production of polysaccharide ethers. The mixing system is designed to ensure thorough mixing and homogeneization or suspension of the reactants. The reaction is endothermic so that the reactor must be heated. Heating means consisting of heating coils wrapped around the exterior of the reactor cylinder wall are described (col. 4, lines 58-60).

CA 1,121,875 discloses an apparatus and method for determining the level of material in a container for liquids. There is no mention or suggestion that the container is or can be a chemical reactor, even less a stirred polymerization reactor. The problem with polymerization reactors is not only the control of the level of liquid but the detection and control of possible deposits of polymer on the reactor wall. CA 1,121, 875 does not provide any hint to solve such problem.

It is therefore an object of the present invention to provide a production process for EP(D)M elastomers and a polymerisation reactor for use in said process which ensure improved quality of the copolymers/terpolymers obtained, as well as an improved stability of the reaction in terms of constancy of the reaction parameters in time and space.

The above and other objects and advantages of the invention, as will be illustrated in the following description, are achieved by a production process of EP(D)M elastomers in solution comprising the polymerisation reaction of the monomers in which ethylene, propylene, optionally a diene, catalytic system, hydrogen and an hydrocarbon solvent for said EP(D)M are fed continuously to a stirred reactor (CSTR) with formation of a reaction bath in which the EP(D)M elastomer dissolves in the hydrocarbon solvent, characterised in that:

i) said reaction bath is kept at a boiling condition at a temperature from 40 to 60° C. and at a pressure from 0.6 MPa to 1.3 MPa, whereby partial vaporization of said reaction bath occurs;
ii) from 40% to 80% of the heat generated by the polymerisation reaction is removed by said partial vaporization of the reaction bath;
iii) the monomers, solvent and other fluids formed by said partial vaporization of the reaction bath are withdrawn from said reactor, compressed, condensed, and, after joining with other recycle and fresh feed, subcooled to a temperature below the temperature of the reaction bath and recycled to the reactor;
iv) from 20% to 60% of said reaction heat is removed by introducing in said reactor said monomers, solvent and fluids that have been subcooled according to step iii).

A further aspect of the invention relates to a CSTR reactor for polymerisation in solution of ethylene, propylene and optionally diene with formation of EP(D)M in a hydrocarbon solvent of said EP(D)M, said reactor being a substantially cylindrical reactor with a ratio between height (H) and diameter (D) of between 1 and 6, preferably between 2 and 4, characterized by comprising a distributor of recycled gases having a circular or polygonal shape placed on the bottom of the reactor, a stirring device comprising un upper, an intermediate and a lower impeller, all mounted spaced apart on a motorized vertical shaft, and an array of inlet ports for fluids, said ports being placed in the proximity of said intermediate impeller, the reactor further comprising a gamma ray control device for the level of said bath.

BRIEF DESCRIPTION OF THE FIGURES

The invention is illustrated also with reference to the following figures.

The diene used in the process according to the invention to produce an EPDM elastomer is a non-conjugated diene selected from the group consisting of ethylidene norbornene (ENB), dicyclopentadiene (DCPD) and 1,4-hexadiene (HD). The diene is present in the EPDM thermopolymer typically in a quantity of less than 15% weight, preferably from 8 to 12 wt. %. ENB is the preferred diene.

The process of the invention is based on a method of removing the heat of the polymerisation reaction by a combination of partial vaporization of the bath and use of sub-cooled fluids recycled to the reactor.

The partial vaporization is achieved by keeping the bath at a boiling condition at a temperature from 40 to 60° C. and at a pressure from 0.6 MPa to 1.3 MPa. The amount of heat removed by this method is from 40% to 80% of the total reaction heat. Preferably the heat removed by this method is from 50% to 70% of the total reaction heat.

With the term "subcooling" it is meant the operation of cooling each of the fluids to be recycled to the reactor to a temperature below the temperature of the reaction bath, namely below 40-60° C. The recycled fluids having such temperature are called "subcooled fluids". The amount of heat removed by introducing the subcooled fluids in the reactor is from 60% to 20% of the total reaction heat. Preferably the heat removed by this method is from 50% to 30% of the total reaction heat.

In the process of the invention the polymerization reaction is carried out in a boiling liquid, so that the temperature is the same in each point of the reactor. By setting the composition of the bath, namely the concentration of the monomers and the molecular weight regulator in the solvent, the pressure at which the solution boils and the composition of the gas-phase produced by the partial vaporization of the solution are also set.

The heat produced by the polymerization reaction varies depending on the EP(D)M to be produced, but on average it is of about 700 Kcal/kg. Exact values of the reaction heat are known to the person skilled in the art. Also, the latent heat of vaporization depends on the composition of the liquid phase, on average it is of about 70 Kcal/kg. Exact values of the vaporization heat can be calculated by the person skilled in the art. Since the ratio between the polymerization heat and vaporization heat is of about 10, if the whole polymerization heat were removed by boiling the reaction bath, 1 kg of elastomer produced would cause vaporization of about 10 kg of liquid from the bath. If the split between heat removal by vaporization and heat removal by subcooling is 50%-50%, each kilogram of elastomer produced generates 700 Kcal, 350 of which are removed by subcooling and 350 are removed by vaporization of 5 kg of liquid. If the split is 60% by vaporization and 40% by subcooling, the heat to be removed by subcooling is 700×0.4=280 Kcal and the heat to be removed vaporization is 700×0.6=420 Kcal, which causes vaporization of 6 kg of liquid. It is thus apparent that by measuring the flow rate of the vapours released from the reactor it is possible to know the flow rate of the elastomer produced, at each second of operation of the reactor.

A production control system is thus provided which processes the data generated by detection instruments suitable to detect and measure the relevant process parameters, so that the exact composition of the elastomer produced is known and kept constant at each time of operation of the process. The key components of this production control system are:

a) Analyzer of the composition of the gas phase released from the reactor;
b) Detector of the flow rate of the gas phase released from the reactor;
c) Detector of the flow rate of the liquid condensed from the gas phase released from the reactor and recycled to the reactor;
d) Analyzer of the composition of the liquid of point c) above;
e) Temperature detector of the liquid of point c) above;
f) Detector of temperature and flow rate of each raw material fed to the reactor, such as ethylene, propylene, diene, solvent, hydrogen, catalyst;
g) Device adjusting the ratios of the monomers flow rates;
h) Devices adjusting the ratios of the components of the catalytic system; and
i) Devices adjusting the temperature of the fluids fed to the reactor;
j) Detector of the level of liquid.

Figure 1:
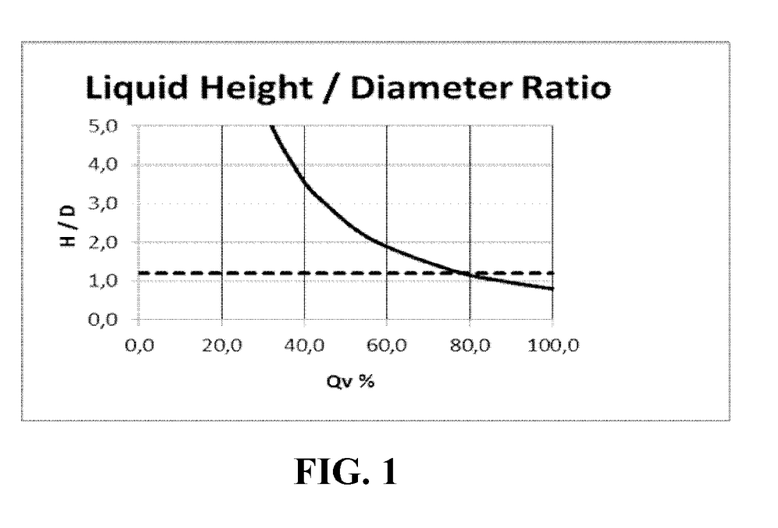
FIG. 1 is a diagram showing the correlation between the height/diameter ratio of the reactor and the heat removed by vaporization of the bath.

FIG. 1 shows the percentage of polymerization heat removed by vaporization (Qv %) as a function of the size of the reactor expressed as ratio of the height of the liquid in the reactor and the diameter of the reactor (H/D), by assuming that the speed of the upward flow of the vaporized gases is of 0.04 m/sec, to avoid entraining of liquid droplets into the gas phase. The diagram shows that if the amount of heat removed by boiling is less than 40%, a H/D ratio above about 3.5 would be required. The disadvantages of too "slim" reactors have already been discussed. On the other hand, if the amount of heat removed by boiling is more than 80% a H/D ratio below about 1.2 would be required. A reactor of this type would not allow the use of a stirring system comprising two submerged impellers and would not ensure optimal mixing of the reaction bath.

Figure 2:
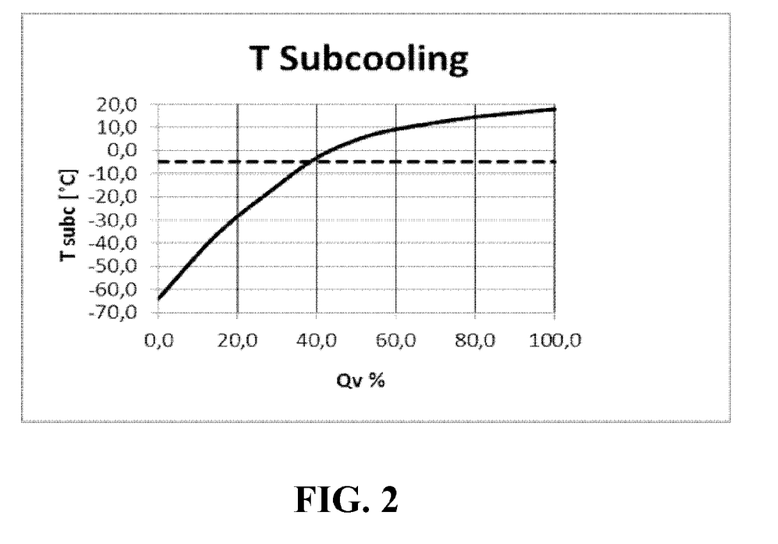
FIG. 2 is a diagram showing the correlation between the temperature of sub-cooling of the vaporized fluids and other recycle and feed fluids, and the heat removed by recycling the sub-cooled fluids to the reactor.

FIG. 2 shows the percentage of polymerization heat removed by vaporization (Qv %) as a function of the temperature of subcooling (Tsubc [° C.]). This shows that to avoid a too high ΔT with respect to the reaction temperature, thus to avoid too high temperature gradients around the feed point and the use of special refrigeration systems, it is appropriate to remove from 40% to 80% of the heat by boiling, namely by partial vaporization of the bath, so that the temperature of subcooling is above about −5° C. Removing less than 40% of the polymerization heat by boiling/vaporization would require a too low temperature of subcooling.

According to the process of the invention, for each EP(D)M to be produced a particular combination of heat removed by vaporization and heat removed by subcooling is set and kept constant during the process. Such particular combination may vary within the ranges defined above but it does not substantially vary during the process to produce a given EP(D)M.

It has been found that the removal of the heat of the polymerisation reaction by this particular combination of vaporization achieved by boiling the reaction bath and use of subcooled fluids brings about an optimal performance of the polymerisation reaction, for at least the following reasons:
a) the boiling, distributed uniformly throughout the mass of the reaction bath, and the vapour bubbles formed by boiling, contribute significantly to the turbulence of the bath and therefore to the mixing of the whole reaction mass. This allows to establish conditions of homogeneity with respect to the concentrations of the various reagents within the reaction bath;
b) the boiling of the reaction mass also ensures a uniform temperature in all the points of the reactor;
c) the remaining amount of the reaction heat removed by subcooling the raw materials, solvent and recycled fluids with respect to the reaction temperature is a simple and effective heat removal method as the heat is exchanged directly between clean fluids at normal thermal levels.

It has also been found that the removal of the heat of the polymerisation reaction by this particular combination of vaporization achieved by boiling the reaction bath and use of subcooled fluids allows to optimize the size of the reactor in terms of height/diameter ratio. The Hr/D ratio of the reactor thus ranges from 1 to 3, preferably from 1.2 to 2, wherein Hr is the height of the reactor, which is higher than H defined above, which is the height of the liquid in the reactor.

As discussed above, for each type of EP(D)M a particular combination (split) of heat removed by vaporization and heat removed by subcooling is set. Such split depends on the composition of the bath and the other process parameters. Once that the temperature of subcooling is also set, the amount of liquid that vaporizes by boiling is directly proportional to the production rate. A process control system controls monomers feeds as a fixed ratio of the amount of vaporized liquid.

Figure 3:
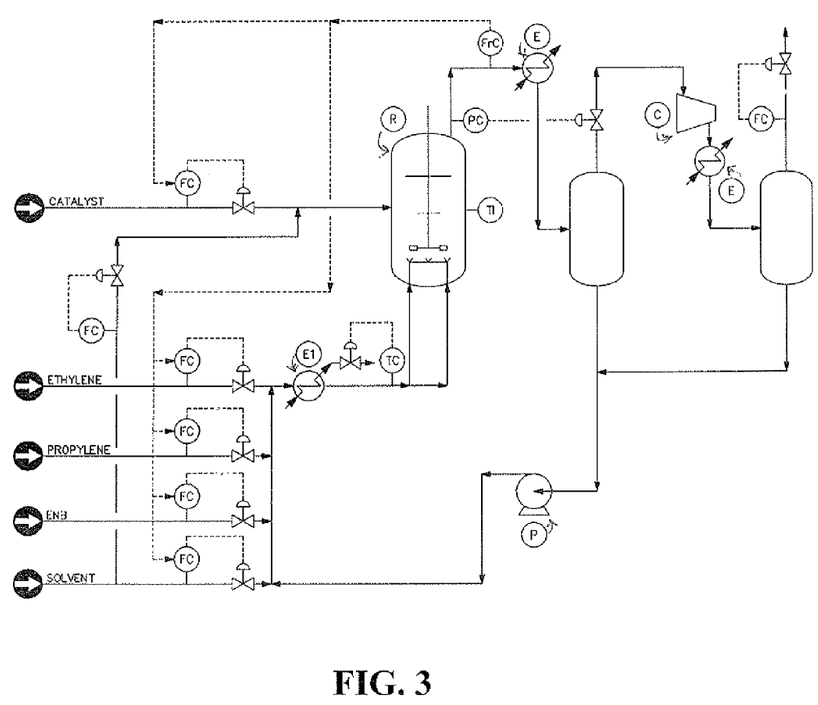
FIG. 3 shows a general scheme of the process.
Figure 4:
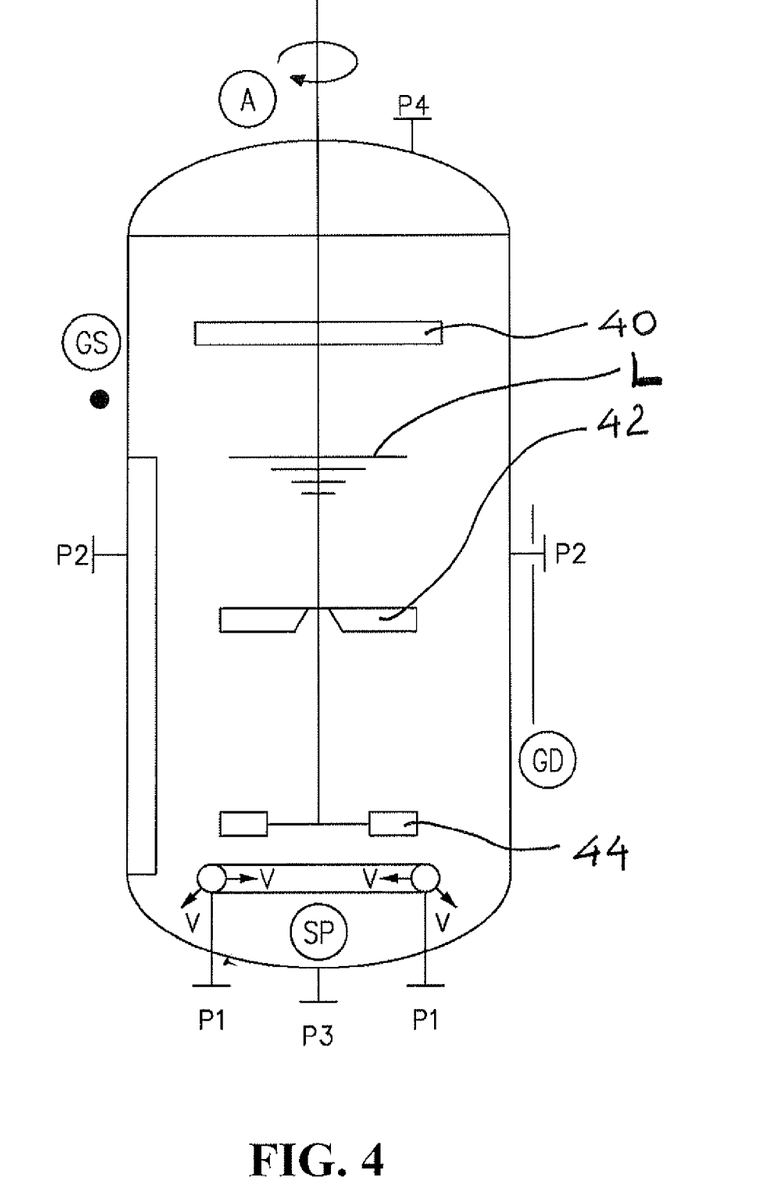
FIG. 4 schematically shows the reactor which constitutes a further aspect of the invention.

As illustrated in FIG. 3, the fluids 1 vaporized inside the reactor R are compressed in the compressor C, cooled and condensed in the condensers E, and pumped by means of the pump P to subcooler E1. Before entering the subcooler E1, fresh feeds are added to the recycle stream, so that one subcooled stream is fed to the reactor R. This stream of subcooled fluids is introduced into the bottom of the reactor R via an appropriately designed distributor SP (FIG. 4). The pressure of the reactor is controlled and kept constant by means of a pressure control device PC mounted on the line downstream the reactor. A flow rate control device FrC mounted on the same line measures the total flow of the vaporized gases and its possible variations. The output of this measurement is used by the control system to control and adjust the monomers and solvent feeds, so that the composition of the bath in the reactor and the residence time are kept constant. By fixing the subcooling temperature of the recycled fluids it is thus possible to keep constant also the temperature of the reactor, which is the boiling temperature corresponding to the value of pressure set within the range 0.6-1.3 MPa.

A control system based on the features described above allows to achieve a fast adjustment of the flow rates of the fluids fed to the reactor in case of upset of the reaction or of changes in the reactivity of the system without affecting the ratios among the monomers, thus the composition and properties of the EP(D)M produced.

Since the polymerisation heat is approximately ten times the evaporation heat of solvent and monomers, by removing about 50% of the polymerisation heat by vaporization of the reaction bath, a recycling of compressed and cooled vapours is obtained which is at least five times the amount by weight of the polymer produced. A good distribution of this flow rate furthermore contributes significantly to the stirring and homogeneity of the reaction mass. For this purpose the form and positioning of the recycled fluid distributor inside the reactor is important.

As can be seen in FIG. 4, the reactor R is equipped with a stirring system A comprising a stirrer with several baffles, of appropriate structure, which allows an optimal distribution of solvent, elastomer produced, monomers, catalyst and molecular weight regulator, and avoids entrainment of liquid in the current of vapours released from the reactor. This stirring system is further described in the following of the description.

Figure 5:
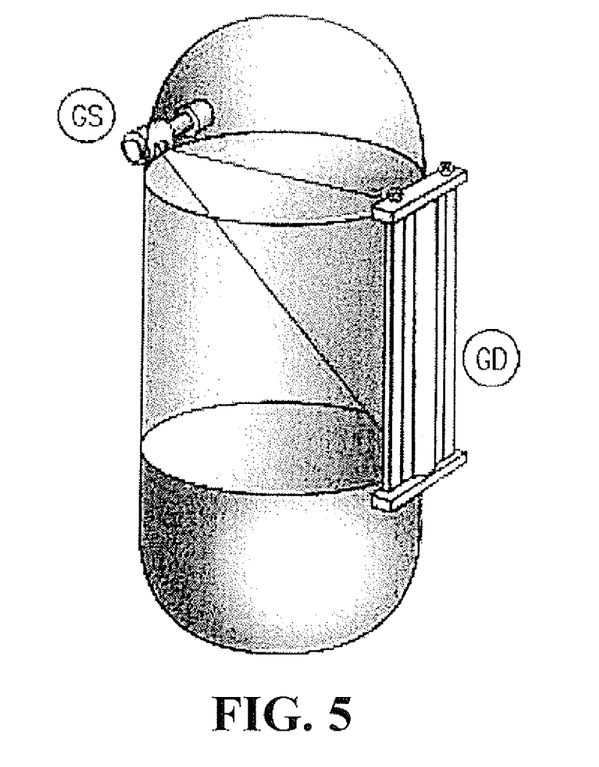
FIG. 5 schematically shows the level control device applied to the reactor.

The reactor R also features a particular positioning of the inlet ports P2 of the liquids and a special device for level control of the bath GS/GD, better illustrated in FIG. 5, which allows to achieve a reduction, almost until elimination, of the deposits of polymer on the walls. If said deposits form, the control device allows quantification of them, in order to decide whether to proceed with cleaning operations before the deposits affect the reaction and contaminate the product. In fact any deposits of polymer change as they age inside the reactor and when they detach they can contaminate the fresh polymer. This device for level control is further described in the following of the description.

The reactor volume is defined by the residence time, which is the time required to produce the quantity of polymer per unit of catalytic system desired (in this case the time is 30 minutes, 0.5 hours), by the volume of polymeric solution discharged (for a typical product it is approximately 21.5 m$^3$/1,000 kg of polymer) and by the degree of filling of the reactor considered acceptable (60% in normal conditions, 70% max and 55% min) Therefore the volume that a reactor must have to produce 1,000 kg/h of EPDM is: 22.5×0.5/0.6=18.75 m$^3$. The diameter of the reactor must be such that the speed of the vapours that are released by the reaction mass and are released from the top of the reactor is less than the decantation speed of any drops of liquid that may form immediately above the surface of the liquid. The experiments performed on industrial reactors showed that the limit speed of the vapours which should not be exceeded in order to avoid entrainment of liquid is 0.06 m/sec. Preferably, the limit speed of the upward vapours is about 80% of the value found experimentally, i.e. 0.8×0.06=0.048 m/sec and a reactor oversizing of 20% is considered, i.e. it is assumed that a reactor designed for 1,000 kg/h must be able to work without entrainment of liquid up to 1200 kg/h. Therefore the limit speed to be considered is 0.04 m/sec. Since the polymerisation heat of the EP(D)M is on average approximately 10 times the latent vaporization heat of the reaction bath, i.e. 700 kcal/kg polymerisation heat and 70 kcal/kg latent evaporation heat, if the whole polymerisation heat were removed by vaporization, the evaporate flow rate for 1,000 kg/h of polymer would be 10,000 kg/h. If 50% of the heat is removed by vaporization, hence the evaporate flow rate for 1,000 kg of polymer is 5,000 kg, which for the density of the vapours in the reactor operating conditions (approximately 0.9 MPa and 50° C.) of 14.5 kg/m$^3$ corresponds to a volumetric flow rate of 5,000/14.5=345 m$^3$/h. For this volumetric flow rate to flow upwards at a speed of 0.04 m/sec, the reactor must have a section of 345/3,600/0.04=2.4 m$^2$, with diameter of 1.75 m.

An example of sizing of the EP(D)M polymerisation reactor according to the invention is given below, wherein P is the amount of EP(D)M produced as ton/h:

| | |
|---|---|
| Solution flow rate at discharge | 2,000 × P kg/h |
| Solution density at reactor discharge | 533 kg/m$^3$ |
| Volumetric flow rate at discharge | 12,000 × P/533 = 22.5 P m$^3$/h |
| Required residence time | 30' |
| Reaction volume | 22.5 P × 30/60 = 11.25 P m$^3$ |
| Reactor filling | 60% |
| Reactor volume | 11.25 P/0.6 = 18.75 P |
| Polymerisation heat | 700 kcal/kg |
| Latent vaporisation heat | 70 Kcal/kg |
| Polymer heat removed by vaporization | 50% |
| Heat produced by P ton/h of EPDM | P × 700 × 1000 Kcal/h |
| Heat removed by vaporization | 700 × 1,000 kcal/h |

-continued

| | |
|---|---|
| Quantity of evaporate | 0.5 × P × 700 × 1000/70 = 5000 × P kg/h |
| Vapour density | 14.44 kg/m$^3$ |
| Vapour volumetric flow rate | 5,000 × P/14.44 = 346 P m$^3$/h = 346 P/3600 = 0.096 P m$^3$/sec |
| Permitted vapour speed | 0.04 m/sec |
| Reactor section | 0.096 P/0.04 = 2.40 P m$^2$ |
| Reactor diameter | $\sqrt{2.40\ P \times 4/3.14} = \sqrt{3.06\ P} = 1.75\sqrt{P}$ |
| Reactor height (cylindrical) | V/s = 18.75 P/2.40 P = 7.81 P (including height of convex bottoms) |
| Height/Diameter | h/d = 7.81 P/1.75$\sqrt{P}$ = 4.46$\sqrt{P}$ |

| h/d | P |
|---|---|
| 4.46 | 1 |
| 3.16 | 2 |
| 2.58 | 3 |
| 2.39 | 3.5 |
| 2.23 | 4 |

The polymerisation heat removal system by boiling the reaction bath ensures constant composition of the monomers at each point of the reactor, while the mechanical stirring system and positioning of the ports for inlet of the solvent, the fresh monomers and components of the catalytic system (vanadium catalyst, alkyl aluminium and activator) are responsible for good distribution of the liquids entering the reactor.

As shown in FIG. 4, the stirrer consists of a system with three impellers: an upper impeller 40, positioned at the level of the reactor upper tangent line, with 2 blades inclined of 45°, acting downwards, with diameter approximately 75% of the reactor diameter. This impeller is positioned above the level L of the liquid bath and has the function of increasing the decantation speed of the drops of liquid transported above the surface of the liquid, allowing to achieve a higher upward speed of the vapours and therefore to achieve greater quantities of evaporate.

The intermediate impeller 42 is a turbine with 4 blades inclined of 45°, positioned at the same level as the inlet ports P2 for inlet of the liquids for immediate and efficient distribution thereof inside the reaction mass; said level must be such as to allow operation submerged in the liquid also in the case of minimum filling (55%).

Lastly the lowest impeller 44 is positioned just above the lower tangent line. It is a radial turbine with 6 flat blades; the diameter of the turbines is approximately 50% the diameter of the reactor.

The system comprises the possibility of varying the shaft rotation speed from approximately 40 to 100 r.p.m. and varying the position of the two turbine impellers if it is necessary to vary the level of the solution in a field different from the one envisaged by the design. There are three liquid inlet ports, positioned at the same level as the upper turbine and at 120° from one another.

Just above the bottom of the reactor a distributor SP for the subcooled recycled fluids P1 is positioned. This distributor consists of a tube with polygonal or circular shape, provided with one or more sets of holes of suitable diameter and position to give the recycled fluids entering the reactor an adequate speed and orientation for good mixing in the reaction medium. This prevents the solution of elastomer formed from by-passing towards the bottom discharge.

Good distribution of the reagents inside the elastomer solution is thus obtained. Also, gas bubbles of very small size are formed, at least as regards the lighter gas, i.e. the hydrogen which acts as a regulator of the molecular weight. This determines allows to achieve a very high efficiency in terms of less demand for hydrogen to obtain the same molecular weight of the polymer, due to the fact that only the hydrogen present on the surface of the bubble takes part in the reaction and not the hydrogen inside it. In tests on conventional industrial reactors, it has been found that when stirring is poor, a much higher concentration of hydrogen at the same molecular weight of the elastomer is required in the gas phase. This entails a larger quantity of hydrogen to be compressed and recycled and reduces the possibility of controlling the phenomenon. This drawback is overcome in the reactor of the invention.

According to another aspect of the invention, the reactor is provided with a device for controlling the level of the bath and the amount of possible deposits on the wall of the reactor. The device comprises a GS gamma ray source and a gamma ray detector GD (FIG. 5). The source GS is positioned near the upper level of the reaction bath and is mounted so as to send a gamma ray beam through the entire height of the bath. In a diametrically opposite position a gamma ray detector GD is positioned which extends vertically throughout the height of the bath and is therefore suitable for detecting any drop in level of said bath below a minimum threshold. In addition to providing the signal necessary for maintaining the level inside the reactor constant, the device also provides reliable information on the presence and size of possible deposits of elastomer on the reactor walls and on the presence of rubber blocks which, as they age and consequently change, could contaminate the type of elastomer in production. This information is valuable to decide if and when cleaning of the reactor is to be made.

The following examples illustrate the process according to the invention.

EXAMPLE 1

A terpolymer EPDM was produced having the following composition: Ethylene 55 mol %, Propylene 40.5 mol %, ENB 4.5 mol %. The solvent used was hexane. The catalyst system comprised vanadium oxytrichloride ($VOCl_3$) and ethyl aluminium sesquichloride as co-catalyst.

The reactor produced 3,500 Kg/h of polymer, with a residence time of 30 minutes. Heat removal by vaporization was set at 69%, corresponding to about 18,000 Kg/h. To keep a T=50° C. the corresponding pressure at equilibrium was of about 1 MPa. The remaining reaction heat was removed by using a subcooled recycle, set a T of 8.17° C. These data are shown also in Table 1a below. Tables 1b-1f show also the values of the fixed ratio of the raw materials, the composition of the gas-phase, the composition of the terpolymer, the flow rates of the materials fed to reactor, the size of the reactor and the composition of the liquid phase. To operate the process with the capacity of 3,500 Kg/h and to avoid entrainment of liquid due to boiling/vaporization it was used a reactor having a diameter of 3.4 m and a total volume of 64 m$^3$.

TABLE 1a

| Operative Conditions | Terpolymer | Unit |
|---|---|---|
| P | 1.0 | MPa |
| T | 50.0 | ° C. |
| Polymer | 3,500.0 | kg/h |
| $F_{vap}$ | 18,000.0 | kg/h |
| $F_L$ | 40,500.0 | kg/h |
| $F_{C6}$ | 29,836.8 | kg/h |
| $T_{C6}$ | 30.0 | ° C. |
| t perm | 30.4 | min |
| q-vap/q-tot | 0.69 | |

TABLE 1a-continued

| Operative Conditions | Terpolymer | Unit |
|---|---|---|
| T-sub | 8.17 | ° C. |
| $F_{C2-}/F_{vap}$ | 0.1083 | |
| $F_{C3-}/F_{vap}$ | 0.0835 | |
| $F_{ENB}/F_{vap}$ | 0.0175 | |
| $F_{C6-}/F_{vap}$ | 1.6576 | |

TABLE 1b

Composition of the gas - phase in the reactor

| C6 | 0.0466 | mol fract. |
|---|---|---|
| C2- | 0.2384 | mol fract. |
| C2+ | 0.0477 | mol fract. |
| C3- | 0.6035 | mol fract. |
| C3+ | 0.0564 | mol fract. |
| ENB | 0.0000 | mol fract. |
| H2 | 0.0074 | mol fract. |

TABLE 1c

Composition of the terpolymer

| C2- | 0.550 | wt fract. |
|---|---|---|
| C3- | 0.405 | wt fract. |
| ENB | 0.045 | wt fract. |

TABLE 1d

Feed of materials to the reactor

| $F_{C2-}$ | 1,948.6 | kg/h |
|---|---|---|
| $F_{C3-}$ | 1,503.5 | kg/h |
| $F_{ENB}$ | 315.0 | kg/h |
| $F_{C6-}$ | 2,9836.8 | kg/h |

TABLE 1e

Size of the Reactor

| Diameter | 3.4 | m |
|---|---|---|
| Volume | 64.0 | m3 |

TABLE 1f

Composition of the liquid phase in the reactor

| C6 | 0.747506 | wt fract. |
|---|---|---|
| C2- | 0.015471 | wt fract. |
| C2+ | 0.004648 | wt fract. |
| C3- | 0.205543 | wt fract. |
| C3+ | 0.022941 | wt fract. |
| ENB | 0.003889 | wt fract. |
| H2 | 0.000002 | wt fract. |

EXAMPLE 2

A copolymer EPM was produced having the following composition: Ethylene 55 mol %, Propylene 45 mol %. The solvent used was hexane and the catalyst system was vanadium oxytrichloride ($VOCl_3$) and ethyl aluminium sesquichloride as co-catalyst.

The capacity of the reactor was of 3,500 Kg/h with a residence time of 30 minutes. Heat removal by vaporization was set at 64%, corresponding to about 20,000 Kg/h. To keep a T=50° C. the corresponding pressure at equilibrium was of about 0.95 MPa. The remaining reaction heat was removed by using a subcooled recycle, set a T of 9.5° C. These data are shown also in Tables 2a-2f. These tables show also the values of the fixed ratio of the raw materials, the composition of the gas-phase, the composition of the copolymer, the flow rates of the materials fed to reactor, the size of the reactor and the composition of the liquid phase. To operate the process with the capacity of 3,500 Kg/h and to avoid entrainment of liquid due to boiling/vaporization it was used a reactor having a diameter of 3.4 m and a total volume of 64 m³.

TABLE 2a

| Operative Conditions | Copolymer | |
|---|---|---|
| P | 0.96 | MPa |
| T | 50.0 | ° C. |
| Polymer | 3,790.0 | kg/h |
| $F_{vap}$ | 20,000.0 | kg/h |
| $F_L$ | 40,780.0 | kg/h |
| $F_{C6}$ | 30,585.1 | kg/h |
| $T_{C6}$ | 40.0 | ° C. |
| t perm | 30.2 | min |
| q-vap/q-tot | 0.64 | |
| T-sub | 9.65 | ° C. |
| $F_{C2-}/F_{vap}$ | 0.1063 | |
| $F_{C3-}/F_{vap}$ | 0.0937 | |
| $F_{ENB}/F_{vap}$ | 0.0000 | |
| $F_{C6-}/F_{vap}$ | 1.5293 | |

TABLE 2b

| Composition of the gas phase in the reactor | | |
|---|---|---|
| C6 | 0.0490 | mol fract. |
| C2− | 0.2490 | mol fract. |
| C2+ | 0.0281 | mol fract. |
| C3− | 0.6297 | mol fract. |
| C3+ | 0.0361 | mol fract. |
| ENB | 0.0000 | mol fract. |
| H2 | 0.0080 | mol fract. |

TABLE 2c

| Composition of the polymer | | |
|---|---|---|
| C2− | 0.550 | wt fract. |
| C3− | 0.450 | wt fract. |
| ENB | 0.000 | wt fract. |

TABLE 2d

| Feeds of materials to the reactor | | |
|---|---|---|
| $F_{C2-}$ | 2,125.8 | kg/h |
| $F_{C3-}$ | 1,873.5 | kg/h |
| $F_{ENB}$ | 0.0 | kg/h |
| $F_{C6-}$ | 30,585.1 | kg/h |

TABLE 2e

| Size of the reactor | | |
|---|---|---|
| Diameter | 3.4 | m |
| Volume | 64.0 | m3 |

TABLE 2f

| Composition of the liquid phase in the reactor | | |
|---|---|---|
| C6 | 0.760156 | wt fract. |
| C2− | 0.015289 | wt fract. |
| C2+ | 0.002599 | wt fract. |
| C3− | 0.204114 | wt fract. |
| C3+ | 0.013977 | wt fract. |
| ENB | 0.000000 | wt fract. |
| H2 | 0.000002 | wt fract. |

The invention claimed is:

1. A CSTR reactor for polymerisation in solution of ethylene, propylene and optionally a diene with formation of an EP(D)M elastomer in a hydrocarbon solvent of said EP(D)M, said reactor being a substantially cylindrical reactor with a ratio between height (h) and diameter (d) of between 1 and 6, wherein a distributor of recycled gases having a circular or polygonal shape placed on the bottom of the reactor, a stirring device comprising un upper, an intermediate and a lower impeller, all mounted spaced apart on a motorized vertical shaft, and an array of inlet ports for fluids, said ports being placed in the proximity of one of said intermediate impeller, the reactor further comprising a gamma ray control device for the level of said bath.

2. The reactor according to claim 1, wherein said gamma ray control device comprises a gamma ray source (GS) placed in the proximity of the level of the reaction bath to be contained in said reactor, and a gamma ray detector-(GD) diametrically opposed to said source (GS) and vertically extending along the entire height of said bath.

3. The reactor according to claim 2, wherein said control device of said level is connected to a reactor control system.

4. The reactor according to claim 1, wherein said upper impeller has inclined blades acting downwards, said upper impeller being placed above the level of the liquid bath within the reactor.

5. The reactor according to claim 1, wherein said intermediate impeller comprises a turbine with four inclined blades placed at the same level of said inlet ports of said liquids.

6. The reactor according to claim 1, wherein said lower impeller is placed above said distributor (SP) of recycled fluids and comprises a radial turbine having six plane blades.

7. A process for the production of EP(D)M elastomers in solution, comprising the polymerisation reaction of monomers in which ethylene, propylene, optionally a diene, catalytic system, hydrogen and a hydrocarbon solvent for said EP(D)M are fed continuously to a stirred reactor (CSTR) with formation of a reaction bath in which the EP(D)M elastomer dissolves in said hydrocarbon solvent, characterized in that:
   i) said reaction bath is kept at a boiling condition at a temperature from 40 to 60° C. and at a pressure from 0.6 MPa to 1.3 MPa, whereby partial vaporization of said reaction bath occurs;
   ii) from 40% to 80% of the heat generated by the polymerisation reaction is removed by said partial vaporization of the reaction bath;
   iii) the monomers, solvent and other fluids formed by said partial vaporization of the reaction bath are withdrawn from said reactor, compressed, condensed and, after joining with other recycle and fresh feed streams, subcooled to a temperature below the temperature of the reaction bath and recycled to the reactor;
   iv) from 20% to 60% of said reaction heat is removed by introducing in said reactor said monomers, solvent and fluids that have been subcooled according to step iii);

wherein said reactor is a substantially cylindrical CSTR reactor with a ratio between height (h) and diameter (d) of between 1 and 6, and comprising a distributor of recycled gases having a circular or polygonal shape placed on the bottom of the reactor, a stirring device comprising un upper, an intermediate and a lower impeller, all mounted spaced apart on a motorized vertical shaft, and an array of inlet ports for fluids, said ports being placed in the proximity of one of said intermediate impeller, the reactor further comprising a gamma ray control device for the level of said bath.

8. The process according to claim 7, wherein from 50% to 70% of said reaction heat is removed by partial vaporization of said reaction bath and from 50% to 30% of said reaction heat is removed by introducing in said reactor said monomers, solvent and fluids that have been subcooled according to step iii).

9. The process according to claim 7, wherein the gases produced by partial vaporization of said boiling reaction bath are removed from said reactor, cooled at a temperature below 40° C. to form subcooled fluids recycled to said reactor.

10. The process according to claim 7, wherein said recycled fluids are introduced in said reactor via a distributor of recycled gases arranged in bottom of the reactor.

11. The process according to claim 7, wherein the flow rate of the gases produced by partial vaporization of said boiling reaction bath, which is proportional to the productivity of said reactor, is detected, processed and used to control the flow rates of the monomers, solvent and catalyst fed to the reactor by adjusting the ratios among them, whereby a stable of composition of the EP(D)M produced is obtained.

12. The process according to claim 7, wherein the pressure of the reactor is kept constant by a pressure control valve (PC) mounted on the line downstream said reactor, whereby the temperature of the reactor at boiling condition is also kept constant.

13. The process according to claim 8, wherein the gases produced by partial vaporization of said boiling reaction bath are removed from said reactor, cooled at a temperature below 40° C. to form subcooled fluids recycled to said reactor.

14. The process according to claim 8, wherein said recycled fluids are introduced in said reactor via a distributor of recycled gases arranged in bottom of the reactor.

15. The process according to claim 9, wherein said recycled fluids are introduced in said reactor via a distributor of recycled gases arranged in bottom of the reactor.

16. The process according to claim 8, wherein the flow rate of the gases produced by partial vaporization of said boiling reaction bath, which is proportional to the productivity of said reactor, is detected, processed and used to control the flow rates of the monomers, solvent and catalyst fed to the reactor by adjusting the ratios among them, whereby a stable of composition of the EP(D)M produced is obtained.

17. The process according to claim 9, wherein the flow rate of the gases produced by partial vaporization of said boiling reaction bath, which is proportional to the productivity of said reactor, is detected, processed and used to control the flow rates of the monomers, solvent and catalyst fed to the reactor by adjusting the ratios among them, whereby a stable of composition of the EP(D)M produced is obtained.

18. The process according to claim 10, wherein the flow rate of the gases produced by partial vaporization of said boiling reaction bath, which is proportional to the productivity of said reactor, is detected, processed and used to control the flow rates of the monomers, solvent and catalyst fed to the reactor by adjusting the ratios among them, whereby a stable of composition of the EP(D)M produced is obtained.

19. The process according to claim 8, wherein the pressure of the reactor is kept constant by a pressure control valve (PC) mounted on the line downstream said reactor, whereby the temperature of the reactor at boiling condition is also kept constant.

20. The process according to claim 9, wherein the pressure of the reactor is kept constant by a pressure control valve (PC) mounted on the line downstream said reactor, whereby the temperature of the reactor at boiling condition is also kept constant.

21. The reactor according to claim 1, wherein said ratio between height (h) and diameter (d) of between 2 and 4.

* * * * *